United States Patent
McBrien et al.

(10) Patent No.: US 12,359,648 B2
(45) Date of Patent: Jul. 15, 2025

(54) ENGINE IGNITION SYSTEMS

(71) Applicant: Hamilton Sundstrand Corporation, Charlotte, NC (US)

(72) Inventors: Gary McBrien, S. Glastonbury, CT (US); Geoffrey T. Blackwell, Lebanon, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 29 days.

(21) Appl. No.: 17/728,612

(22) Filed: Apr. 25, 2022

(65) Prior Publication Data
US 2023/0340934 A1 Oct. 26, 2023

(51) Int. Cl.
*F02P 3/09* (2006.01)
*F02P 11/02* (2006.01)
*F02P 17/12* (2006.01)

(52) U.S. Cl.
CPC ............ *F02P 3/096* (2013.01); *F02P 11/02* (2013.01); *F02P 17/12* (2013.01)

(58) Field of Classification Search
CPC .. F02P 3/096; F02P 11/02; F02P 17/12; F02P 3/0859; F02P 3/0892; F02C 7/266
USPC .......................................................... 123/596
See application file for complete search history.

(56) References Cited

U.S. PATENT DOCUMENTS

| | | | | |
|---|---|---|---|---|
| 4,425,890 A | * | 1/1984 | Yamaguchi | F02P 5/045 |
| | | | | 123/480 |
| 5,045,964 A | * | 9/1991 | Bennett | F02P 3/0552 |
| | | | | 361/103 |
| 5,065,073 A | * | 11/1991 | Frus | F02P 3/0884 |
| | | | | 60/776 |
| 5,109,151 A | * | 4/1992 | Demizu | F02P 19/02 |
| | | | | 219/205 |
| 5,510,952 A | * | 4/1996 | Bonavia | F02P 3/0869 |
| | | | | 361/251 |
| 5,941,926 A | * | 8/1999 | Taraki | F02P 17/08 |
| | | | | 702/68 |
| 6,195,247 B1 | | 2/2001 | Cote et al. | |
| 6,216,669 B1 | * | 4/2001 | Aoki | F02P 5/1514 |
| | | | | 123/406.52 |
| 6,434,473 B1 | * | 8/2002 | Hattori | F02C 9/28 |
| | | | | 477/30 |

(Continued)

FOREIGN PATENT DOCUMENTS

| | | |
|---|---|---|
| EP | 3549871 A1 | 10/2019 |
| EP | 3855004 A1 | 7/2021 |
| KR | 20080016105 A * | 2/2008 |

OTHER PUBLICATIONS

Aircraft Gas Turbine Engine Ignition Systems, 2020, Aeronautics Guide. <https://www.aircraftsystemstech.com/p/turbineengine-ignition-systems-since.html> (Year: 2020).*

(Continued)

*Primary Examiner* — Logan M Kraft
*Assistant Examiner* — Joshua Campbell
(74) *Attorney, Agent, or Firm* — Kinney & Lange, P.A.

(57) ABSTRACT

An engine ignition system can include a multifunction controller, and an exciter operatively connected to the multifunction controller. The multifunction controller can be configured to control the exciter to output an ignition voltage. The multifunction controller can be configured to perform at least one other engine control function.

8 Claims, 7 Drawing Sheets

(56) References Cited

U.S. PATENT DOCUMENTS

| | | | | |
|---|---|---|---|---|
| 9,013,856 | B2* | 4/2015 | Mahajan | F02P 3/0892 361/256 |
| 9,350,142 | B2* | 5/2016 | Obe | F02P 3/0435 |
| 11,002,238 | B2 | 5/2021 | Youssef et al. | |
| 2002/0162541 | A1* | 11/2002 | Sogawa | F02M 35/116 123/490 |
| 2002/0162542 | A1* | 11/2002 | Dutart | F02M 57/023 123/299 |
| 2003/0067284 | A1* | 4/2003 | Costello | F02P 15/003 322/59 |
| 2006/0080026 | A1* | 4/2006 | Tanaka | F02N 11/0862 701/113 |
| 2007/0144473 | A1* | 6/2007 | Nakamura | F01L 13/0026 123/90.15 |
| 2009/0107149 | A1* | 4/2009 | Galey | F02C 7/266 60/39.827 |
| 2010/0154382 | A1* | 6/2010 | Wright | F02P 3/0892 219/205 |
| 2013/0047577 | A1* | 2/2013 | Mahajan | F02P 3/0892 123/169 R |
| 2015/0260107 | A1* | 9/2015 | Wright | F02P 3/0884 315/210 |
| 2018/0128182 | A1* | 5/2018 | Hayama | F02C 7/262 |
| 2018/0209348 | A1* | 7/2018 | Kelly | F02P 3/00 |
| 2019/0040834 | A1* | 2/2019 | Nishio | F02P 17/12 |
| 2019/0120199 | A1* | 4/2019 | Ambroise | F02P 15/003 |
| 2021/0087972 | A1 | 3/2021 | Turcotte et al. | |

OTHER PUBLICATIONS

Extended European Search Report issued in Application No. 23168775.7 dated Dec. 14, 2023.

Chapter 6—Aircraft Systems In: "Pilot's Handbook of Aeronautical Knowledge", Oct. 24, 2008 (Oct. 24, 2008), United States Department of Transportation—Federal Aviation Administration, XP055103313. https://www.faa.gov/regulations_policies/handbooks_manuals/aviation/phak.

Extended European Search Report issued in Application No. 23168775.7, dated Aug. 9, 2023.

Communication Pursuant to Article 94(3) EPC dated Jan. 9, 2025, for corresponding European Patent Application No. 23168775.7, 3 pgs.

* cited by examiner

ENGINE IGNITION SYSTEMS

FIELD

This disclosure relates to engine ignition systems.

BACKGROUND

Gas turbine engines require an ignition source to start the combustion process and relight the combustor should the flame go out during operation. The scheme typically is one where a high energy spark is produced that ignites the fuel source. Once commanded to produce sparks, the sparks typically continue at a prescribed rate until a command to stop is issued. In modern architectures there is typically a controller, a power supply, an exciter unit, high tension leads, and igniter plugs.

The controller commands the exciter to deliver energy to the igniters and monitors system health. The power supply provides low voltage AC or DC to powers the exciter. The exciter is the ignition power supply and driver that converts the low voltage power supply input to a much higher internal voltage, and applies the high voltage to charge an energy storage device. The exciter discharges the energy storage device stored energy to the output. Traditionally, the maximum possible charge rate defines the max spark rate. The high tension leads connect the exciter high voltage output via interconnecting wire leads to the igniter plugs, and the igniter plugs create the spark for ignition with the high voltage discharge from the energy storage device.

Such conventional methods and systems have generally been considered satisfactory for their intended purpose. However, there is still a need in the art for improved engine ignition systems. The present disclosure provides a solution for this need.

SUMMARY

An engine ignition system can include a multifunction controller, and an exciter operatively connected to the multifunction controller. The multifunction controller can be configured to control the exciter to output an ignition voltage. The multifunction controller can be configured to perform at least one other engine control function.

The multifunction controller can be located in low temperature area, for example. The exciter can be located in a high temperature area and housed separately from the multifunction controller.

In certain embodiments, the multifunction controller can include an ignition switch mode control module. The multifunction controller can be a FADEC, for example, (e.g., having the mode control module added thereto).

The exciter can include one or more ignition step up drivers. The multifunction controller can include one or more ignition step up drivers.

The system can include a power supply connected to the multifunction controller to provide power to the one or more step up drivers. In certain embodiments, a power supply can be provided to the controller and the controller can be configured to provide power to the exciter.

In certain embodiments, the exciter can include an energy storage device, and a firing switch connected between the energy storage device and an ignitor output. The firing switch can be configured to be controlled by the multifunction controller.

The exciter can include a step-up transformer connected between a power supply input and the energy storage device. The exciter can include a monitor connected to the energy storage device to monitor a state of the energy storage device. The monitor can be connected to the multifunction controller to provide data to the multifunction controller.

In certain embodiments, the exciter can include a step up driver operatively connected to the step up transformer to control the step up transformer. The step up driver can be controlled by the mode control module.

In certain embodiments, the exciter can include a power switch driver operatively connected to the firing switch to control the firing switch. In certain embodiments, the power switch driver can be controlled by the mode control module.

In certain embodiments, the multifunction controller can include a first driver and a second driver connected to and controlled by a logic block. The logic block can be connected to a processing module that includes the mode control module, for example. The step up driver can be controlled by the mode control module via the first driver through the logic block based on commands from the processing module. The power switch driver can be controlled by the mode control module via the second driver through the logic block based on commands from the processing module.

The multifunction controller can include a precision clock operatively connected to the logic and/or the processing module. The multifunction controller can include a data acquisition module operatively connected to the monitor of the exciter.

In accordance with at least one aspect of this disclosure, a method can include integrating heat sensitive logic components of an engine ignition system in an existing engine controller thereby reducing weight of the engine ignition system and thermally protecting the heat sensitive logic components of the engine ignition system. The method can include thermally isolating the existing engine controller from an exciter of the engine ignition system. The method can include any other suitable method(s) and/or portion(s) thereof.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
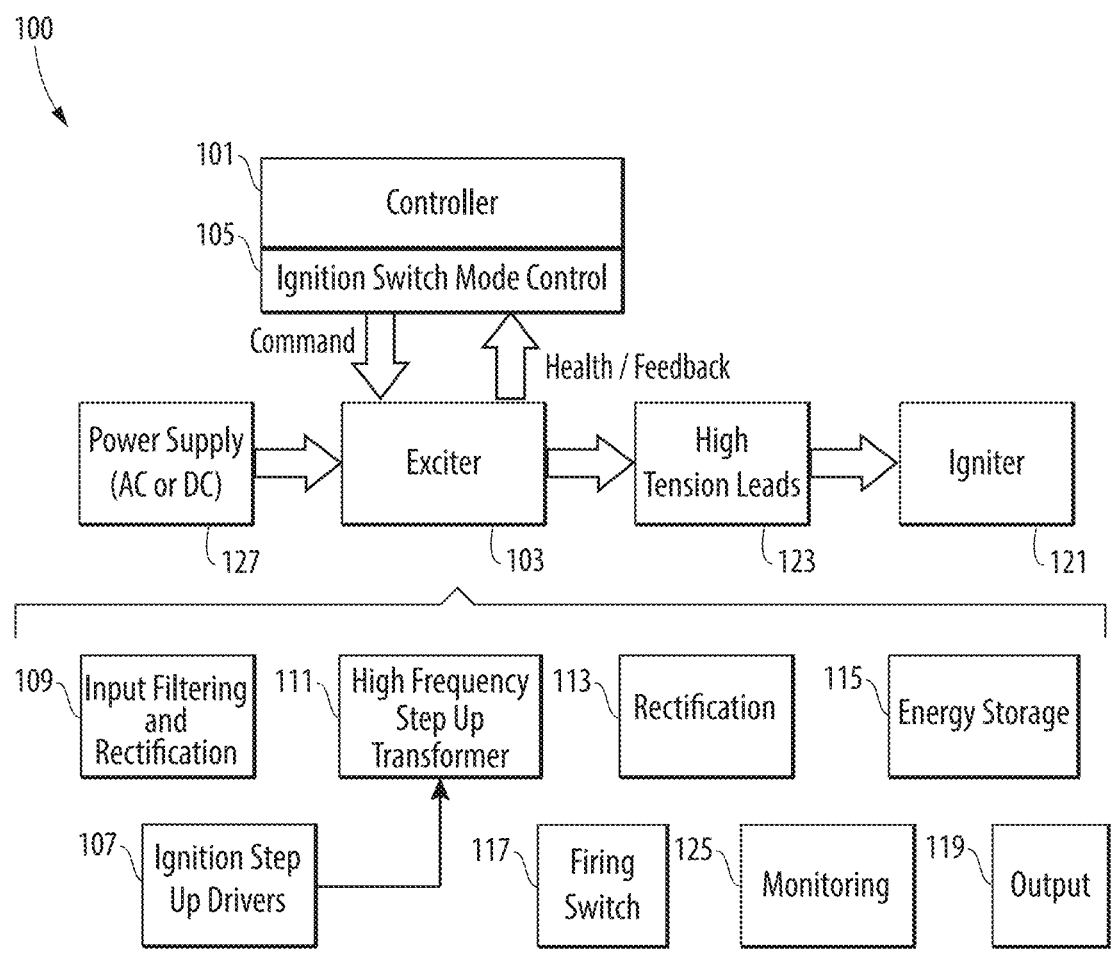
FIG. 1 is a schematic diagram of an embodiment of a system in accordance with this disclosure.
Figure 2:
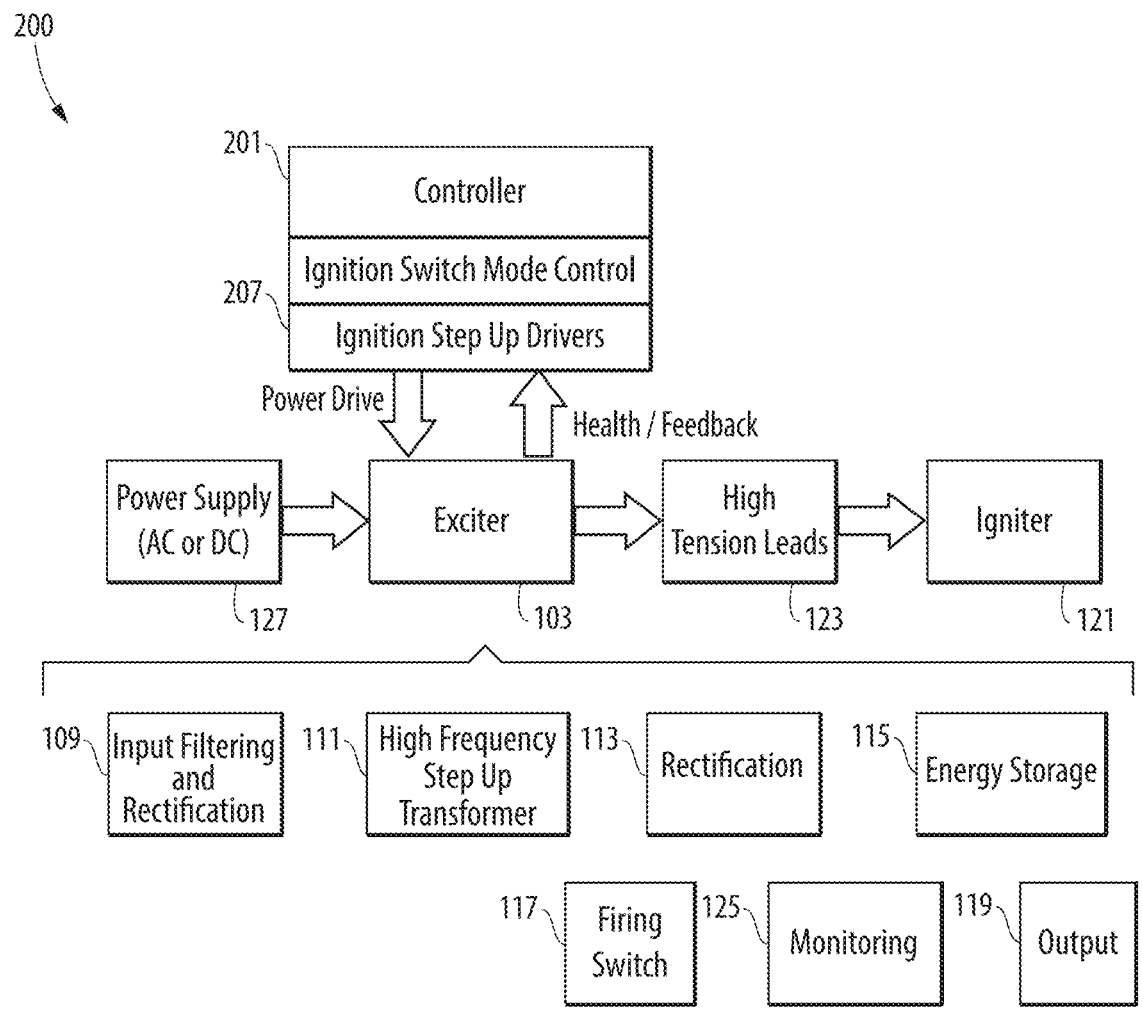
FIG. 2 is a schematic diagram of another embodiment of a system in accordance with this disclosure.
Figure 3:
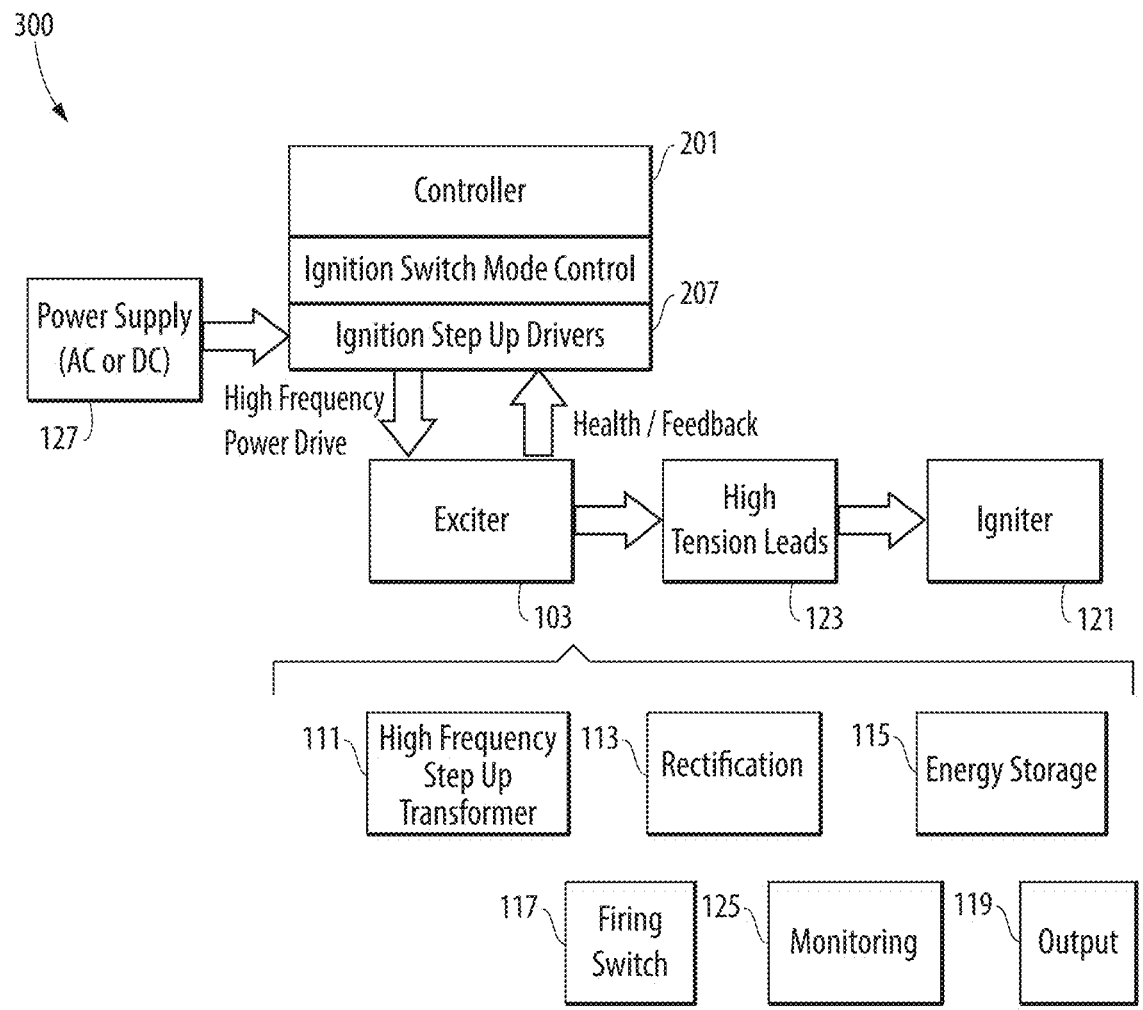
FIG. 3 is a schematic diagram of another embodiment of a system in accordance with this disclosure.
Figure 4:
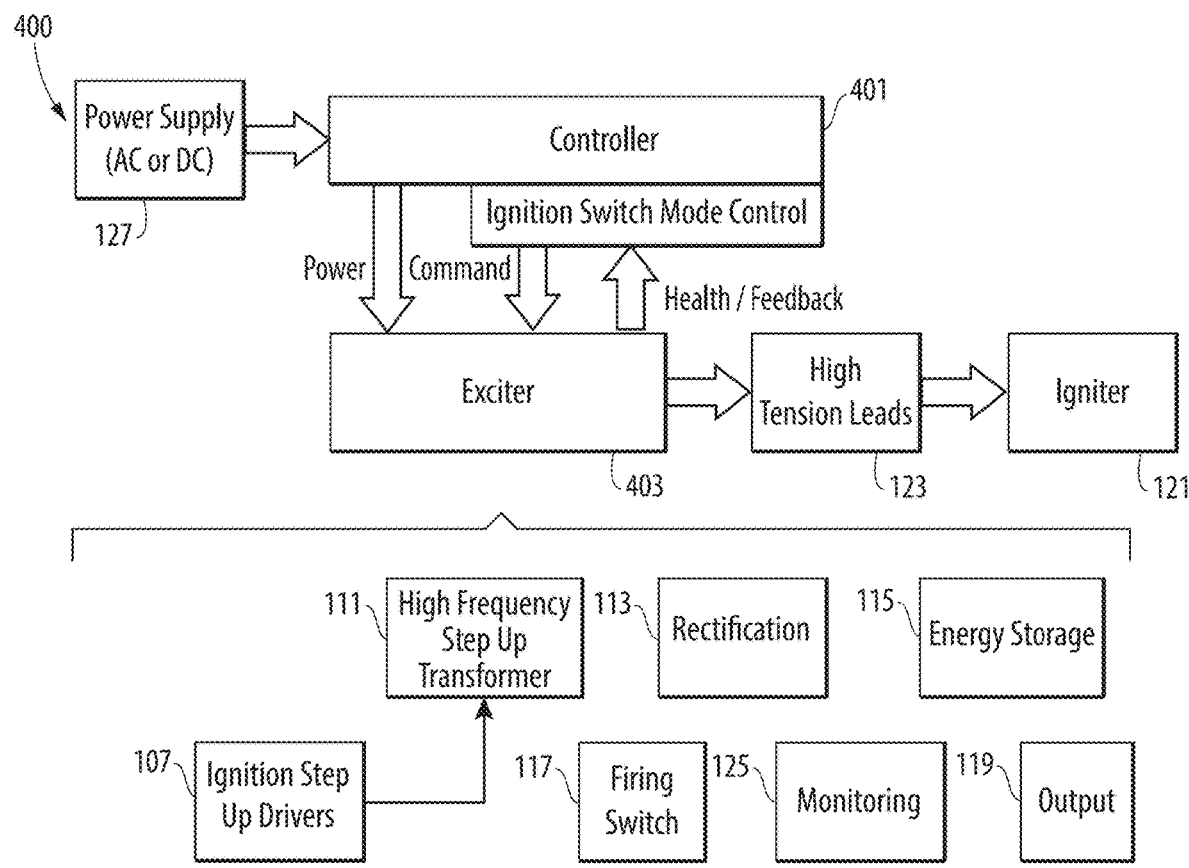
FIG. 4 is a schematic diagram of another embodiment of a system in accordance with this disclosure.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-7. Certain embodiments described herein can be used to provide lighter and smaller engine ignition systems, for example.

Referring to FIG. 1, an engine ignition system 100 can include a multifunction controller 101, and an exciter 103 operatively connected to the multifunction controller 101. The multifunction controller 101 can be configured to control the exciter 103 to output an ignition voltage. The multifunction controller 101 can be configured to perform at least one other engine control function (e.g., engine speed in response to throttle commands, for example). Any suitable other engine control function is contemplated herein.

The multifunction controller 101 can be located in low temperature area (e.g., thermally isolated from a hot area of an engine), for example. The exciter 103 can be located in a high temperature area and housed separately from the multifunction controller 101. The two can be connected via one or more cables, for example (and/or wirelessly if suitable power and/or signal transfer is accounted for).

In certain embodiments, the multifunction controller 101 can include an ignition switch mode control module 105. The multifunction controller 101 can be a FADEC (full authority digital engine controller), for example (e.g., having the mode control module added thereto). Hardware that already exists on the FADEC can be utilized to the maximum extent to integrate the mode control module 105 and/or any other suitable control function, thereby reducing weight and component count of the overall system.

The exciter 103 can include one or more ignition step up drivers 107. The exciter 103 can include any suitable hardware configured to function as an exciter. In certain embodiments, the exciter 103 includes an input filtering and rectification device 109, a high frequency step up transformer 111 (e.g., connected to the ignition step up drivers), a rectifier 113, an energy storage device 115 (e.g., a capacitor), a firing switch 117 connected between the energy storage device 115 and an output 119 (e.g., connected to igniter 121 via leads 123), and a monitor 125 configured to monitor a state of the energy storage device 115 and communicate with the controller 101. As shown in the embodiments of a system 200 in FIG. 2, in certain embodiments, the multifunction controller 201 can include the one or more ignition step up drivers 207, e.g, integrated therewith.

In certain embodiments, the system 100, 200 can include a power supply 127 directly connected to the exciter 103. As shown in the embodiment of a system 300 in FIG. 3, in certain embodiments, a system 300 can include a power supply 127 connected to the multifunction controller 101 to provide power to the one or more step up drivers 207. As shown in the embodiment of a system 400 in FIG. 4, in certain embodiments, a system 400 can have a power supply 127 that can be provided to the controller 101 and the controller 101 can be configured to provide power to the exciter 103 (and the exciter 403 may not need any input power filtering or rectification).

Figure 5:
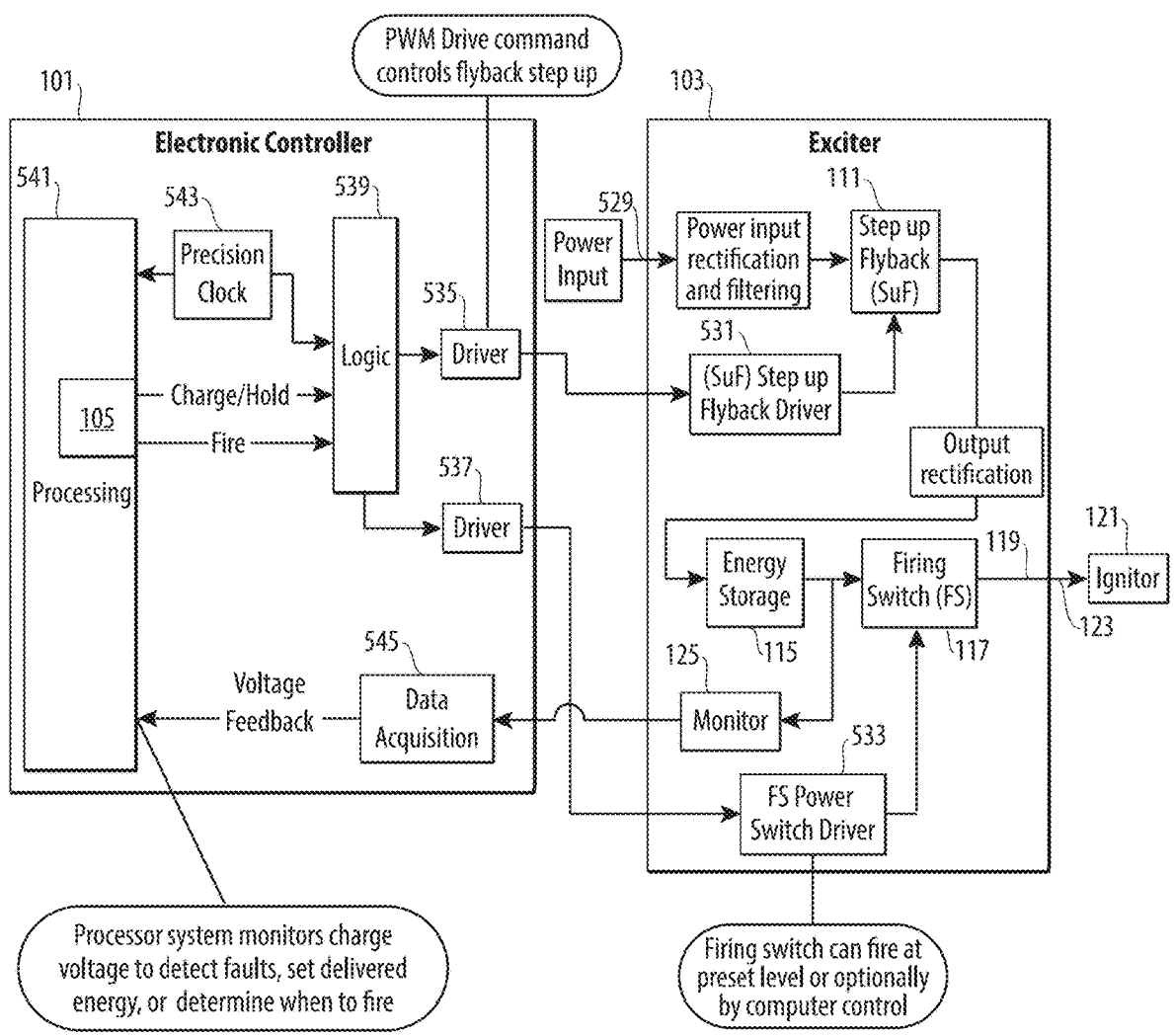
FIG. 5 is a schematic circuit diagram of an embodiment of a system in accordance with this disclosure.

Referring additionally to FIG. 5, in certain embodiments, as described above, the exciter 103 can include an energy storage device 115, and a firing switch 117 connected between the energy storage device 115 and an ignitor output 119. In certain embodiments, the firing switch 117 can be configured to be controlled by the multifunction controller 101. However, in certain embodiments, the firing switch 117 can be configured to automatically close when the charge on the energy storage device 115 reaches an ignition threshold without control from the controller 101.

The exciter 103 can include a step-up transformer 111 connected between a power supply input 529 and the energy storage device 115. The exciter 103 can include a monitor 123 connected to the energy storage device 115 to monitor a state of the energy storage device 115. The monitor 123 can be connected to the multifunction controller 101 to provide data to the multifunction controller 101.

In certain embodiments, the exciter 103 can include a step up driver 531 operatively connected to the step up transformer 111 to control the step up transformer 111. The step up driver 531 can be controlled by the mode control module 105.

In certain embodiments, the exciter 103 can include a power switch driver 533 operatively connected to the firing switch 117 to control the firing switch 117. In certain embodiments, the power switch driver 533 can be controlled by the mode control module 105.

In certain embodiments, the multifunction controller 101 can include a first driver 535 and a second driver 537 connected to and controlled by a logic block 539. The logic block 539 can be connected to a processing module 541 that includes the mode control module 105 (or a portion thereof), for example. The step up driver 531 can be controlled by the mode control module 105 via the first driver 535 through the logic block 539 based on commands from the processing module 541. The power switch driver 533 can be controlled by the mode control module 105 via the second driver 537 through the logic block 539 based on commands from the processing module 541.

The multifunction controller 101 can include a precision clock 543 operatively connected to the logic 539 and/or the processing module 541. The multifunction controller 101 can include a data acquisition module 545 operatively connected to the monitor 125 of the exciter 103.

While FIG. 5 shows an embodiment of a disambiguation of a system 100, any other suitable disambiguation of components to reduce size, weight, and/or part count is contemplated herein. For example, the multifunction controller 101 may only require the addition of a physical logic block 539 and/or the drivers 535 and 537. All other components may already exist in the controller 101 (e.g., the clock 543 and data acquisition module 545) depending on the other functions handled by the controller 101 (e.g., which can be a FADEC), and many software functions can be hosted on common hardware.

Figure 6:
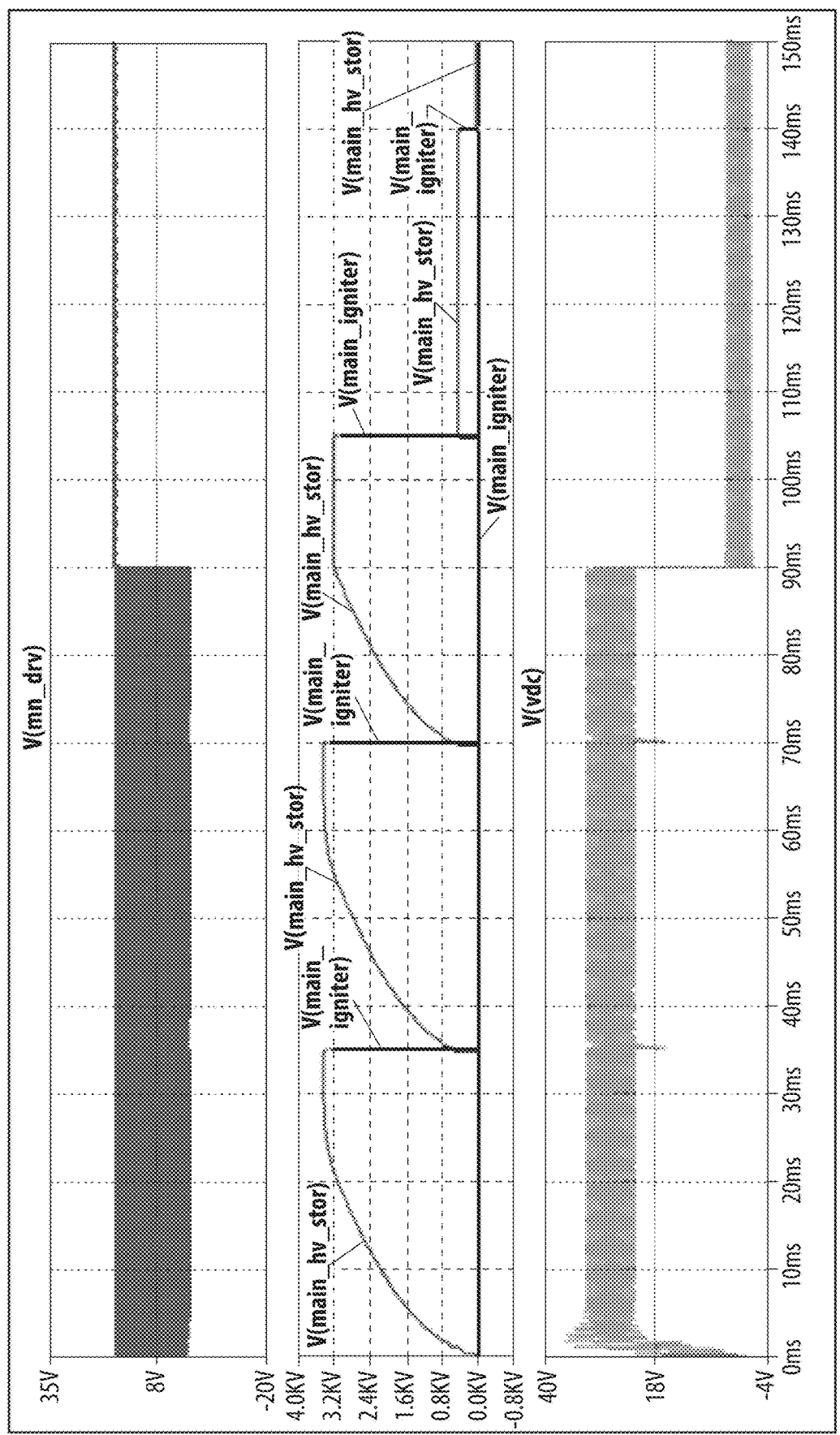
FIG. 6 is a chart showing storage voltage and igniter voltage, for example.

FIG. 6 is a chart showing waveforms of an embodiment of system storage voltage and igniter voltage, for example. The example shown is running at 25 kHz. The flyback transformer can be small, with a 10 uH primary inductance. Parallel circuits can be used for Main and Augmentation, and can run independently. In the example shown, the SM signal applied has resulted in 3 sparks, followed by a commanded shunt condition to shut the power off. In this case the spark rate is approximately 28 sparks per second. In certain embodiments, the spark rate can be as slow as desired.

Figure 7:
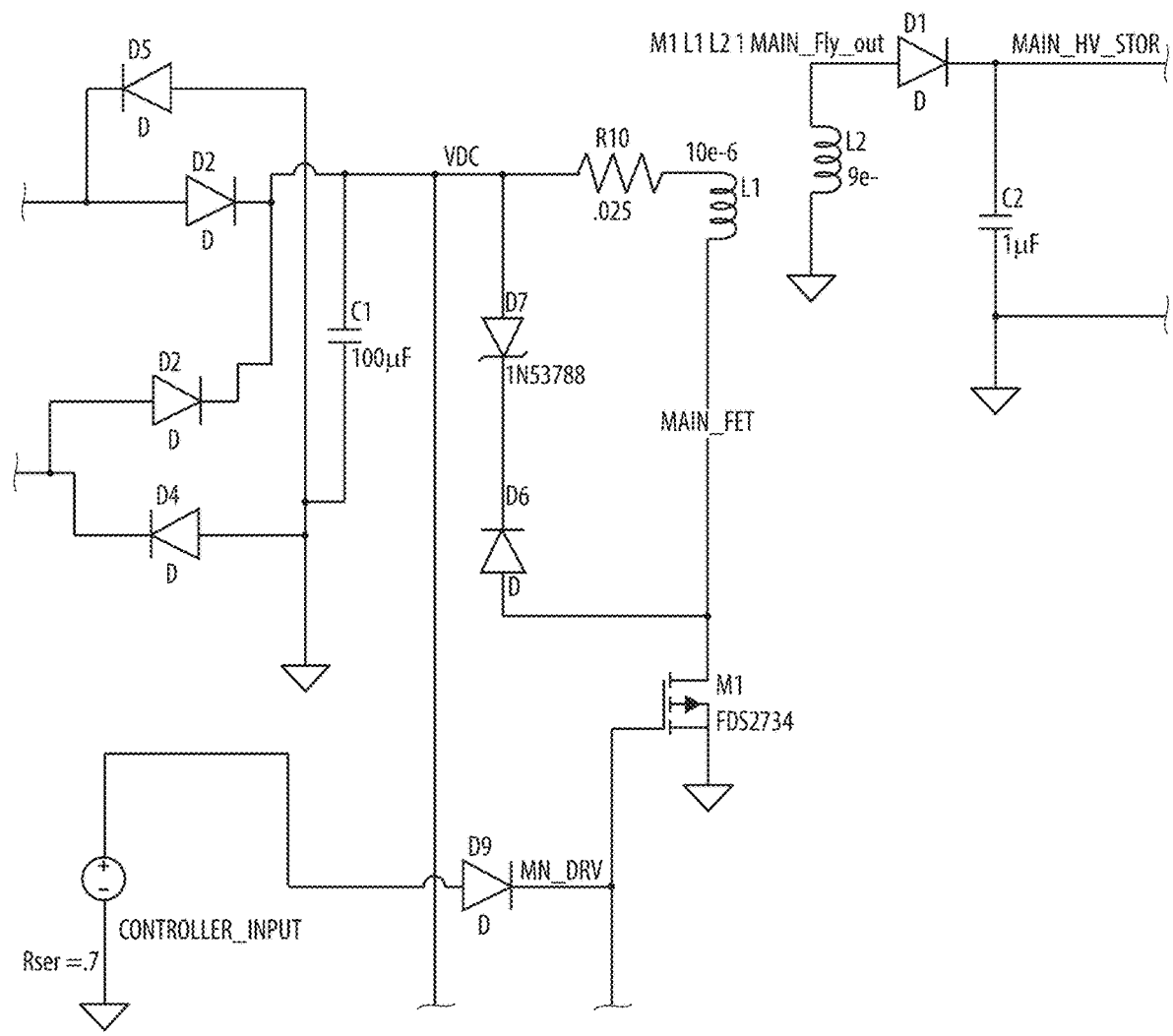
FIG. 7 is a circuit diagram of an embodiment of an exciter in accordance with this disclosure.

FIG. 7 is a circuit diagram of an embodiment of an exciter in accordance with this disclosure. Shown is exciter input rectification, switch mode driver, flyback transformer, and energy storage, and showing the controller input command. Any other suitable circuit arrangement for an exciter is contemplated herein.

In accordance with at least one aspect of this disclosure, a method can include integrating heat sensitive logic components of an engine ignition system in an existing engine controller thereby reducing weight of the engine ignition system and thermally protecting the heat sensitive logic components of the engine ignition system. The method can include thermally isolating the existing engine controller from an exciter of the engine ignition system. The method can include any other suitable method(s) and/or portion(s) thereof.

Embodiments can shift hardware locations and functions in a way that allows each component to exist in an acceptable thermal environment, while also realizing a weight and part count decrease. Certain modern controllers (e.g., FADECS) have excess computing power can handle added functions without compromising functionality or speed. Embodiments require less circuitry (size, part count, and/or weight) than even the simplest of traditional systems. For example, traditional mode control hardware required 6 square inches of space, but this functionality integrated into the multifunction controller allows it to be much smaller, e.g., less than 1 square inch of added hardware. In certain embodiments, the only thing physically added to the controller hardware can be the ignition switch mode control module (e.g., a PWM driver and/or related components). Embodiments of a mode control module can be directly connected to the ignition step up drivers and provide a PWM signal to the step up driver.

Certain embodiments can move the step up drive to the controller, can have power wired to a high frequency power drive, and/or can have power routed through the controller. Utilizing embodiments, high voltage control can be directly commanded by the FADEC of the engine.

In certain embodiments of a system, functionality that already resides in the multifunction controller can be leveraged to provide the capability that the more modern exciter needs. The controller can already have extensive input filtering, internal power supplies, computational resources, thermal management, circuit board assemblies for packaging the circuits, and vibration isolation. The controller can be a highly sophisticated electronic unit that incorporates a tremendously capable computer, memory, and a multitude of different input and output types, such as sensor interfaces and effector drivers. The previous simple on/off command to the exciter can be replaced with a switch mode supply command, and the simple health circuit can be replaced with more precise voltage feedback. By using resources that already reside inside the controller, those functions can be eliminated from the exciter and replaced by more capable hardware in the controller. Using this more-integrated approach, embodiments can provide the robust capability of the older technology, especially temperature and vibration capability, and also provide the advantages of more modern technology.

The controller in embodiments can provide a suitable high frequency drive signal to directly drive the ignition step up driver in the exciter. The high frequency step up transformer in the exciter can be for example in one embodiment a flyback type transformer (e.g., as shown in FIG. 5). A transistor switch in the exciter can be used as the ignition step up driver. In certain applications, the switch frequency could be as low as 25 kHz, or much higher, for example as high as 100 kHz or more. A lower frequency can minimize EMI concerns and reduce the switching device power dissipation, whereas a higher frequency allows for smaller magnetics and filter components. Feedback from the exciter provided to the controller can show the value of stored internal charge within the exciter. When firing is desired, the controller can provide a SM (Switch Mode) signal to the exciter, causing the ignition driver to cycle in step with the input signal, thereby switching the flyback transformer, which, over time, charges up the exciter internal energy storage device at a desired rate. When the energy storage voltage reaches a threshold, the firing switch in the exciter can apply the stored energy to the output of the exciter, resulting in a spark at the igniter plug.

The firing switch can take on any suitable forms. It can be a gas discharge tube, a solid state switch, for example, or any other suitable firing switch. The switch can be set up to fire at a preset voltage or it could be set up to fire based on a command from the controller.

Using the combination of monitoring the charge voltage (and therefore stored energy), as well as a coordinated activation of the firing switch, a range of functionality can be accomplished. In cases where the firing switch does not isolate the output, the charged voltage can be monitored for a decay when not charging, which can indicate that the dielectric withstand capability of the HTL or igniter has been compromised. Or if the firing switch does isolate, the exciter can also be operated in a way that it attempts to fire at lower voltages than the minimum withstand capability of the igniter, to detect faults in the high tension leads and igniter such as dirty or cracked insulation. If there is a discharge of energy at a voltage lower than the required minimum, it can indicate there is a problem in the system.

The controller can vary the pulse width of the driver frequency as necessary to charge the system. A lower pulse width produces a slower charge rate but lower current draw from the main supply. A wider pulse width will allow the system to be charged more quickly. The charge time can be tailored for the input power supply capability and also it can be made long enough to allow for frequent sampling by the feedback circuits which are used by the controller to monitor the system.

Based on the desired firing rate, after waiting a suitable precise amount of time, the controller can again start the switch sequence, causing another charge-discharge cycle to occur. This sequence can be repeated as necessary until the time duration required for the spark sequence is complete.

Historically the ignition function has been provided with hardware that is fairly independent of the control system. Past engine controls have been hydromechanical or simple electronic devices that have provided a simple on/off command to the exciter module. The command may be provided by a simple pilot activated switch.

In some cases the ignition command is provided continuously after engine start, relying on the pressure of the running engine to quench (or shut off) spark production when it is not needed. High tension systems (for example greater than 12,000V peak output pulse), have spark plug designs that auto-quench at high combustor pressure so they don't continue to spark once the engine is fully running.

Low tension systems (less than the typical 12,000V peak pulse voltage of high tension systems) have spark plug designs that will not auto-quench, and unless commanded off will continue to spark regardless of engine operating condition.

In either case the systems share a common feature which is to raise a low voltage input supply to a high voltage that is the basis for the energy stored in the exciter, and upon receiving the command to produce sparks the exciter provides the rest of the functionality independently until commanded to turn off.

As the controllers have become more and more sophisticated over time, the ignition systems have continued to remain largely independent and self contained relative to the controller.

Older systems exhibit limited sophistication and use older technology components to perform the internal functions. Systems have used either low frequency voltage step up transformers connected to AC supplies, or simple relaxation (chopper relay) oscillators that produce an AC excitation from a DC voltage supply to produce the necessary high voltage. These high voltages are in turn rectified and applied to a storage element, where the voltage increases until the discharge element is triggered, at which case the energy is presented to the output for transmission to the igniter.

One benefit of the older technology is that the components are simple and are available in relatively high temperature capability which is necessary for the equipment to survive in the high temperature environment that is present where the exciters are mounted on the engine.

Older systems can use components that have been around for many years, which can form a simple system, but the components may be large and heavy, and in some cases prone to obsolescence or procurement issues. These work with either AC supplies, or simple chopper type DC supplies.

More modern systems can take advantage of smaller, lighter components. In addition functions such as the firing switch can be upgraded to more modern devices. This runs at a higher frequency which allows for smaller magnetic components but this frequency is generated internally with various internal power supplies and control circuits. The additional functions are shown to the lower left of the figure. Although the system now can use smaller lighter components and can have better monitoring capability, there is an additional burden of requiring the extra power, control, and driver circuits shown. In addition to the added space and weight of these functions, there is also the additional complication of these circuits requiring functionality provided by integrated circuits, which in standard electronics devices made available in industry have a more limited temperature range than the typical installation requires. These components also are more susceptible to the high vibration environment present in the exciter.

An alternate architecture is proposed that uses a more optimally integrated approach between the controller and the exciter to provide weight savings, increased reliability, more flexible capability, enhanced functions, and higher temperature capability of the exciter.

Embodiments can include any suitable computer hardware and/or software module(s) to perform any suitable function (e.g., as disclosed herein).

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. An engine ignition system, comprising:
   a multifunction controller comprising:
      a first driver;
      a second driver;
      a logic block electronically connected to the first driver and to the second driver; and
      a processing module electronically connected to the logic block, wherein the logic block is configured to control operation of the first driver and to control operation of the second driver based on commands issued to the logic block by the processing module; and
   an exciter operatively connected to the multifunction controller and electrically connected to a power source and to an ignitor, the exciter comprising:
      an energy storage device for storing electric energy;
      a step up transformer connected between the power source and the energy storage device;
      a step up driver that is:
         electronically connected to the first driver, such that the first driver is able to control operation of the step up driver, and
         electronically connected to the step up transformer, such that the step up driver is able to control operation of the step up transformer;
      a firing switch connected between the energy storage device and the ignitor; and
      a power switch driver that is:
         electronically connected to the second driver, such that the second driver is able to control operation of the power switch driver, and
         electronically connected to the firing switch, such that the power switch driver is able to control operation of the firing switch.

2. The system of claim 1, wherein the multifunction controller is located in a low temperature area.

3. The system of claim 2, wherein the exciter is located in a high temperature area and housed separately from the multifunction controller.

4. The system of claim 3, wherein the multifunction controller includes an ignition switch mode control module.

5. The system of claim 4, wherein the multifunction controller is a FADEC.

6. The system of claim 1, wherein the exciter includes a monitor connected to the energy storage device to monitor a state of the energy storage device, wherein the monitor is connected to the multifunction controller to provide data to the multifunction controller.

7. The system of claim 1, wherein the multifunction controller includes a precision clock operatively connected to the logic and/or the processing module.

8. The system of claim 7, wherein the multifunction controller includes a data acquisition module operatively connected to the monitor of the exciter.

\* \* \* \* \*